(12) United States Patent
Grogg et al.

(10) Patent No.: US 8,314,580 B2
(45) Date of Patent: Nov. 20, 2012

(54) BRUSHLESS DC-MOTOR

(75) Inventors: Silvio Grogg, Gossau (CH); Curdin Stäheli, Wetzikon (CH); Martin Ochsenbein, Russikon (CH)

(73) Assignee: Belimo Holdings AG, Hinwil (CH)

( * ) Notice: Subject to any disclaimer, the term of this patent is extended or adjusted under 35 U.S.C. 154(b) by 520 days.

(21) Appl. No.: 11/569,890

(22) PCT Filed: Jun. 3, 2005

(86) PCT No.: PCT/CH2005/000311
§ 371 (c)(1),
(2), (4) Date: Aug. 18, 2008

(87) PCT Pub. No.: WO2005/119898
PCT Pub. Date: Dec. 15, 2005

(65) Prior Publication Data
US 2009/0009115 A1    Jan. 8, 2009

(30) Foreign Application Priority Data

Jun. 4, 2004 (CH) .......................... 942/04
Dec. 22, 2004 (CH) ..................... 2122/04

(51) Int. Cl.
*H02P 6/18* (2006.01)
(52) U.S. Cl. ............... 318/400.34; 318/254.1; 318/610; 318/611; 318/626
(58) Field of Classification Search ............ 318/400.34, 318/254.1, 439, 610, 611, 626
See application file for complete search history.

(56) References Cited

U.S. PATENT DOCUMENTS

| | | | | |
|---|---|---|---|---|
| 4,426,606 A | * | 1/1984 | Suita et al. | 318/375 |
| 4,712,050 A | | 12/1987 | Nagasawa et al. | |
| 5,245,256 A | * | 9/1993 | Cassat et al. | 318/400.35 |
| 5,327,052 A | | 7/1994 | Sakurai et al. | |
| 5,783,917 A | * | 7/1998 | Takekawa | 318/400.1 |
| 5,841,252 A | * | 11/1998 | Dunfield | 318/400.32 |
| 5,915,070 A | * | 6/1999 | Takekawa et al. | 388/811 |
| 5,942,870 A | | 8/1999 | Koschorrek et al. | |
| 6,051,944 A | | 4/2000 | Doemen | |
| 6,153,993 A | * | 11/2000 | Oomura et al. | 318/434 |
| 6,218,795 B1 | * | 4/2001 | Syukuri | 318/400.17 |

(Continued)

FOREIGN PATENT DOCUMENTS

DE         197 45 312 A1    4/1998
(Continued)

*Primary Examiner* — Walter Benson
*Assistant Examiner* — David Luo
(74) *Attorney, Agent, or Firm* — Thaddius J. Carvis (57) ABSTRACT

A DC-motor (46) actuates a highly-reduced reduction gear of an actuating drive for a flap or valve in order to regulate a gas or liquid volume flow, particularly for heating/ventilation/climatization, or fire or room protection. Current flow in the stator coils (A, B, C) is commutated in a program-controlled manner without integrated position sensors. Algorithms enable counting rotations of rotor (54) of the DC-motor (46). Problems related to the principle of motor rotation speed at low rpm are prevented. The DC-motor (46) includes a stator (44) having three stator coils (A, B, C) which extend over 3n stator poles (52), and an annular-shaped permanent magnet rotor (54) having 2m permanent magnet segments with alternating polarity (N, S), a coaxial cup-shaped external rotor (110) and a coaxial drive shaft (108), whereby n and m are whole multiplication factor numbers (1, 2, 3, 4) and are different from each other. Drive shaft (112) comprises, preferably, a spring (120) for the automatic return in case of current interruption.

26 Claims, 7 Drawing Sheets

U.S. PATENT DOCUMENTS

| | | | |
|---|---|---|---|
| 6,534,938 B1 * | 3/2003 | Wu et al. | 318/400.28 |
| 6,826,454 B2 * | 11/2004 | Sulfstede | 700/276 |
| 6,979,965 B2 * | 12/2005 | McMillan et al. | 318/160 |
| 7,095,204 B2 * | 8/2006 | Lee et al. | 318/700 |
| 7,304,450 B2 * | 12/2007 | Prudham | 318/721 |
| 2006/0279242 A1 | 12/2006 | Lindemann et al. | |

FOREIGN PATENT DOCUMENTS

| | | |
|---|---|---|
| DE | 103 08 859 A1 | 9/2004 |
| EP | 0 242 039 A1 | 10/1987 |
| EP | 1 267 479 A1 | 12/2002 |
| FR | 2 851 093 | 8/2004 |
| WO | WO 2005/048446 A1 | 5/2005 |
| WO | WO 2005/090831 A1 | 9/2005 |

* cited by examiner

BRUSHLESS DC-MOTOR

The invention relates to a method for controlling a brushless DC motor comprising a stator and a rotor, which has a highly reduced reduction gear of an actuating drive for a flap or valve in order to regulate a gas or liquid volume flow, in particular in the field of heating, ventilation and climatisation (HLK), fire and room protection. Furthermore the invention concerns a brushless DC motor without position sensors for performance of the method.

Electric actuating drives for motorisation of actuators in heating, ventilation and climatisation systems (HLK systems) have been produced for more than 30 years. HLK actuators guarantee an economic volume flow regulation of gases or liquids, in particular air and water. As a compact unit they comprise not only the drive but also pressure sensors and regulators, all combined in one device.

Ventilation systems are increasingly used in buildings, in particular residential, office, commercial and industrial buildings, normally combined with fire and smoke protection devices. In ventilation systems volume flow regulation with swivelable air flaps plays an essential role. The volume flow is measured with a suitable measuring instrument, for example with the NMV-D2M by Belima Automation AG, CH-8340 Hinwil, which is formed as a compact unit of drive, pressure sensor and regulator, and which transmits measurement values to the electronics.

To move a flap in a ventilation system or a ball valve in a water pipe system, relatively weak motors must activate large area or large volume control elements. Precise and stable adjustment is possible only with a very high reduction. To swivel a flap or turn a ball valve through an acute or right angle requires numerous rotations of the shaft of the electric motor.

Between the motor and valve can be arranged mechanical means for transmission of the motion, in particular spring drives. DC motors originally produced preferably have brushes made of graphite which mechanically regulate the commutation of the individual electrical phases of the rotor, the stator in this case being fitted with permanent magnets.

Electronically commutating DC motors of the known type, also called EC motors, are particularly suitable for applications which utilise the benefits of contactless and electronically controlled commutation. With commutation controlled in this way the electronic current feed of the stator coils shifts in steps from pole to pole, "pulling" the rotor with it. Brushless DC motors are characterised by low production costs and a long life in conjunction with preferential regulation properties for speed and precision.

A torque generated by such an electromagnetic rotating field is almost constant irrespective of the position of the rotor, and dependent in a linear manner on the three-phase current.

Each of the three phases of a brushless DC motor is controlled by one or two transistors, depending on whether the coils are to be powered in one or two directions. With just three control pulses per electrical rotation, the windings are utilised relatively poorly. Controlling the windings with six transistors guarantees a higher utilisation of the windings and a more even torque output. The coils can be connected in a star or triangle, in both cases the torque is greater if each of the three phases is controlled by two transistors.

In order to determine the suitable moment to switch the power transistors during commutation, the present position of the rotor in relation to the stator must be known. Particularly suitable here are silicon-free resolvers and Hall effect sensors, both of which give the absolute position of the rotor irrespective of speed. For reasons of cost and miniaturisation, the use of sensors is however always more problematical as they must be replaced frequently.

A regular torque is generated for example if the coils are controlled with sinusoidal signals offset by 120°. At lower power rectangular signals can also be used for control because of their steeper zero crossing. As drivers so-called H-bridges are used where each pole of a coil is connected by way of a transistor with a supply voltage and earth. It must however be guaranteed that in the case of two transistors, these are not both conductive at the same time. The H-bridges of the power electronics are controlled as a function of signals from position sensors. They serve for direction formation and are controlled as stop, start and PWM signals using an encoder (PWM=pulse width modulation). The direction of rotation of the rotor is determined by the switching algorithm, the rotation speed of the motor by way of the coil voltage of the coils connected. This can also be triggered by a PWM.

The commutation frequency depends on the specified rotation speed of the motor and the number of pole pairs of the rotor.

In practice two or three stator coils are always powered simultaneously, the difference of two or three coils must be taken into account. The induced voltages of three coil combinations are phase-offset by 120°. By suitable commutation now, depending on direction of rotation, the maximum positive or negative torque can be utilised. A delayed or premature commutation has a direct effect on the torque of the motor to be provided. The optimum switching point for commutation of two and three powered coils differs, it is controlled by commutation algorithms.

The rotor position is normally determined on the motor circuit board by three position sensors, for example Hall effect sensors. Hall effect sensors, when supplied with a constant current, emit a differential voltage as a function of the magnetic field flowing through them, known as the Hall effect.

DE 19745312 A1 discloses a control circuit for a brushless electronically commutated DC motor. Arranged in series with each winding strand of the motor is an electronic switch element which is controlled by a position sensor. Each winding strand is connected by way of a decoupling diode with a common switch point. Arranged parallel to the winding strands and associated decoupling diodes is a protective transistor circuit which eliminates induction-induced voltage peaks.

Although a good efficiency is achieved with simple low-cost components, the disadvantage remains that position sensors need to be replaced.

The inventors have faced the task of creating a method for controlling a brushless DC motor and a DC motor of the type cited initially that eliminates the cost and quality problems related to position sensors.

In relation to the method, the object is achieved according to the invention in that the electrical current flow in the stator coils is commutated under programme control without integral position sensors. Special and refined embodiments of the method are the object of the dependent claims.

The algorithms of all essential procedure processes are entered and stored retrievably in a CPU, suitably in at least one microprocessor, for example a start algorithm, a brake algorithm, a brake algorithm for reverse kick at the stop i.e. a controlled return and braking after a hard stop, wherein the contact pressure is substantially maintained, and finally a relax algorithm with which the reduction gear is fully relaxed.

The retrievably stored algorithms are continuously adapted to practice and improved where necessary i.e. the system is self-learning.

The basic principle according to the invention is to check the polarities of the zero crossings of the three motor phase voltages. Each polarity change on a zero crossing of a phase voltage can be allocated to a particular rotor position. As soon as the corresponding rotor position is reached, the next commutation, i.e. the next current flow to the stator coils, can be modified such that the generated leading magnetic field gives the rotor a torque. Thanks to this system, position sensors can be omitted.

The zero crossings of the phase voltages can however only be clearly detected from a particular minimum rotation speed of the rotor, rotation speeds that are too low give undefined looping sections of sinusoidal or sine-like curves with the zero line.

In a special embodiment of the invention, an electronics unit counts the revolutions per minute (rpm) of the rotor of the DC motor. Preferably each motor commutation is detected and counted, wherein special algorithms for start and stop ensure that motor rotation speeds below around 200 rpm are passed through so quickly that no counting errors occur.

Provided that the counters once at the start have a synchronisation or reference point for allocation to the flap angle, the position regulator always knows precisely the actual value i.e. the precise position of the flap concerned. The counting electronics in this way constitute an almost no-cost replacement for a relatively costly potentiometer that is subject to wear in conventional arrangements.

With reference to the DC motor the object is achieved according to the invention in that it comprises a stator with three coils that extend over 3n stator poles and an annular permanent magnet rotor with 2m permanent magnet segments of alternating polarity (N, S), a cup-shaped external rotor and a coaxial drive shaft, where n and m are whole multiplication factors 1, 2, 3, 4 . . . independent of each other.

Coils and rotor segments can be used together following the rule of combination, in practice however the combinations n=1 and m=1, and n=3 and m=6 have proved particularly advantageous.

An actuating drive activated by a DC motor according to the invention by way of a gear system can be supplemented with a spring, suitably a coil spring, which can be extended or pre-tensioned on motorised operation and hence potential energy stored. The spring is extended preferably but not necessarily in the lift direction. An electronic power fail detection detects failure of the operating voltage, first disengages all bridge switches of the end stage, and thus triggers a return of the pretensioned spring. The DC motor thus becomes free running, the potential energy stored in the spring acts as a torque against the lift direction and sets the free running motor in motion. Depending on the load at the gear output, the pre-tensioned spring accelerates to a correspondingly high speed until the load, friction and spring moment are in equilibrium. When the said load at the gear output supports the spring moment or only loads this lightly, the rotation speed in the spring return can be increased so that the entire mechanical system is endangered. Reaching the end stop is particularly critical. In order to limit the acting kinetic energy and hence the load to a safe level, the rotation speed must be limited. For this in the known manner Zener diodes can be used which limit the motor voltage generated by the generator and disperse any additional energy as heat.

Preferably however use is made of the property of the DC motors that on a short circuit of at least part of their windings, a braking moment occurs which is approximately proportional to the rotation speed. This can be achieved easily on brushless DC motors according to the invention in that two of the three windings are short-circuited. The extent of braking can be set by way of a pulse width modulated control signal (PWM signal). This is done as a function of the actual rotation speed which can be determined at any time by way of the measured zero crossings of the third motor winding that is not short-circuited. Below a programmable limit speed, the PWM signal is set to zero and after exceeding the limit speed, rises continuously to a maximum of 100%. This allows a simple regulation for the speed limitation which can thus be held constant over a wide load range. This prevents, on power failure, the pre-tensioned spring closing the actuation element concerned, for example a valve or flap, too quickly.

Although the method according to the invention and the brushless DC motor are designed in particular for the HLK field, this is not a restriction. Due to dimension-induced adaptations, gas flows, volume flows and/or actuation angles can also be regulated in automobiles in a similar fashion with professional knowledge and ability.

The invention is now explained in more detail below with reference to the embodiment examples shown in the drawing which are also the object of dependent claims. The drawings indicate schematically:

FIG. 1 a block circuit diagram of the entire motor control system for a DC motor, FIG. 2 a wiring diagram for the stator of a DC motor, FIG. 3 a commutation cycle of a DC motor with six rotor positions, FIG. 4 the proportion of individual stator coils in the motor torque according to FIG. 3, FIG. 5 the connection of the phase voltages with the expected polarity of the zero crossing, FIG. 6 braking by blocking, FIG. 7 a brake-stop-start cycle, FIG. 8 the behaviour of a DC motor at the stop, FIG. 9 the relaxing of a DC motor at the stop, FIG. 10 the behaviour of a DC motor when starting under difficult conditions (boost concept), FIG. 11 a variant of a DC motor, FIG. 12 an actuating drive with a DC motor, and FIG. 13 a spring drive according to FIG. 12.

Figure 1:
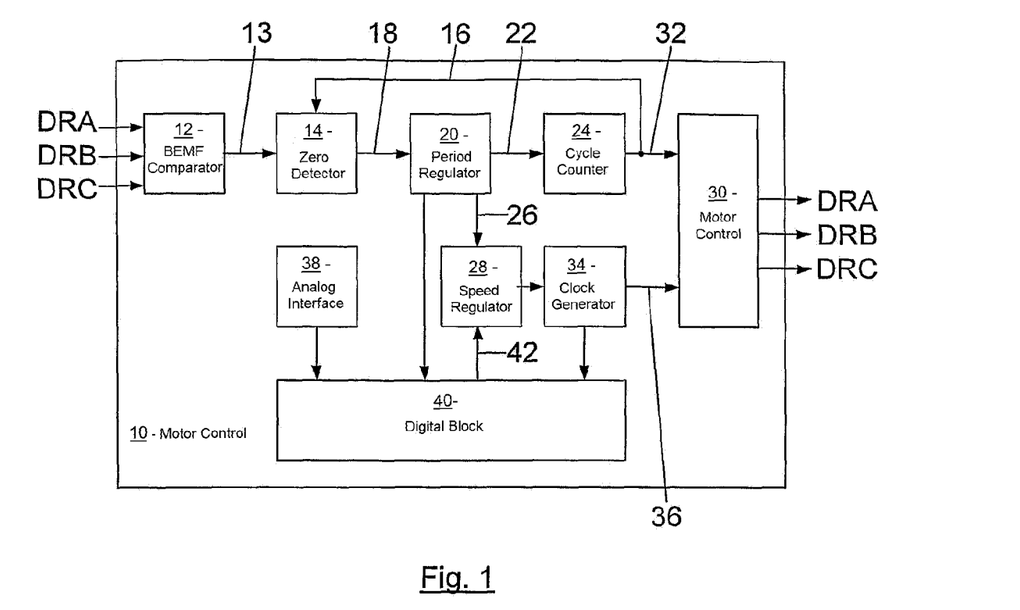
Figure 2:
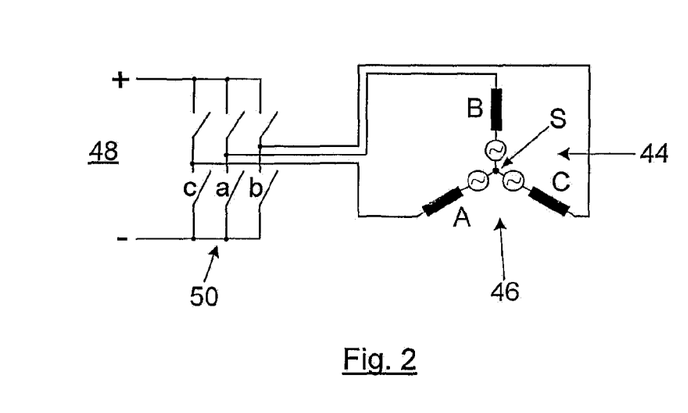

FIG. 1 shows a block circuit diagram of a motor control 10 for a DC motor (46 in FIG. 2). As is normal for a very high reduction, this motor has low power and small dimensions. For details of a reduction gear, reference is made for example to PCT/CH05/000126 by the applicant.

Three motor generator currents are conducted into the motor control 10 to control its voltage DRA, DRB and DRC by way of BEMF comparators 12 (BEMF=back electromagnetic force). The BEMF comparators 12 in the known manner check the polarity of the zero crossings of the phase voltages DRA, DRB and DRC. Each change of polarity, in other words each zero crossing, can be allocated to a particular rotor position of the DC motor 46. As soon as this polarity is known, the next commutation i.e. the new current supply to the stator coils (A, B, C in FIG. 2) is determined.

A subsequent ZERO detector 14 detects the valid zero crossings of the phase voltages DRA, DRB and DRC or their BEMF signals 13, which are indicated by the needle-like ZERO pulses 18. The three phase voltages DRA, DRB and DRC can only be analysed when the ZERO detector 14 receives the corresponding signal 16, which is indicated with a reverse arrow.

A period regulator 20 receives the ZERO pulses 18 and from these calculates the next commutation time. If the next commutation is actually to take place, a NEXT pulse 22 is passed to a cycle counter 24. Furthermore the period regulator 20 outputs a PER signal 26 to a speed regulator 28. PER (PER=time period) means the distance between two ZERO pulses, and is thus inversely proportional to the rotation speed. A speed regulator 28 controls and regulates the number of revolutions of the rotor per time unit, usually per minute, which is indicated as rpm.

The cycle counter 24 counts the whole digit multiples 0, 1, 2, 3 ... and at a motor control 30 outputs a counter value 32 indicated with a CYNO (cycle number). Each of the six counter values 32 in the present case is firmly allocated to one of the six possible H-bridge states to be discussed below. As stated a NEXT pulse 22 controls the cycle counter 24 which thus controls the commutation. As also stated the counter value 32 CYNO gives a feedback in the form of a signal 16 to the ZERO detector 14.

The speed regulator 28 controlled by the PER signal 26 takes place in hardware terms by way of a PI regulator (PI=proportional/integral) of the known type. The nominal value is taken from an OTP cell (OTP=one time programmable). Optionally by way of microprocessors (MP) arbitrary nominal values can be written to a volatile register. The PER signal 26 of the period regulator 20 is used as the actual value. This as stated is inversely proportional to the rotation speed and is calculated out in the speed regulator 28. By way of a PWM clock generator 34, a PWM signal 36 is output to the motor control 30, the duration of a pulse in the present case being 52 µsec. This pulse width modulation PWM corresponds to the voltage applied to the DC motor 46. The PWM frequency of the clock generator 34 in the present case is 19.2 kHz.

The motor control 30 is generated by the PWM modulation 36 and the commutation. The output phase voltages DRA, DRB and DRC are the direct controls for the motor driver in the form of power H-bridges.

An analog interface 38 allows control with analog signals. AZ applications (AZ=on/off) are also possible, and with an external potential, constant SR applications (SR=constant regulator) can also be achieved.

A digital block 40 from a status control (state machine) controls the internal processes of the motor control 10. For starting and braking of the DC motor 46, the digital block 40 generates an ROT signal 42 which it passes to the speed regulator 28.

In a wiring diagram according to FIG. 2 for the stator 44 of a DC motor 46, the poles of a DC power source 48 are indicated with + and −. The stator 44 has three stator coils A, B and C arranged in a star pattern and connected together at a star point S that also forms the zero line. A switch group 50 which is activatable under program control generates a commutation cycle comprising six commutations which is shown in detail in FIG. 3 below.

On a power failure two of the three bridge switches a, b and c are short-circuited to earth, causing a braking moment. In the present case these are bridge switches a and b, whereby a short circuit is formed over the stator coils B and C. Stator coil A is switched off but not short-circuited. Suitably the bridge switches a, b are closed only initially for brief periods which then become ever longer. Generating a braking moment prevents, on a power failure, an actuator returning without control and causing damage. The paired closure of any two bridge circuits a, b, c takes place by way of transistors which receive a pulse width modulated control signal.

Figure 3:
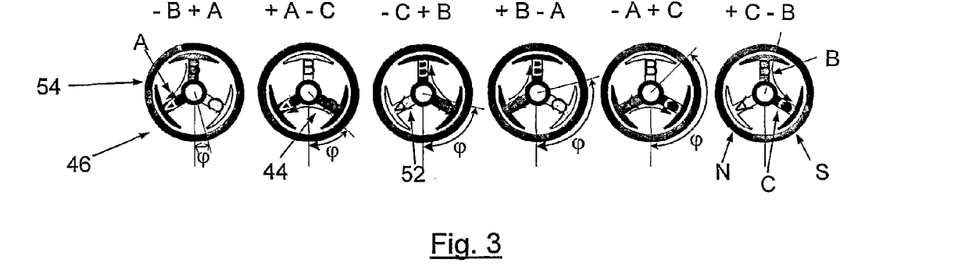

FIG. 3 shows six positions of a permanent magnet rotor 54 of a DC motor 46. The rotor 54 in the present case has four magnetic segments of equal size, alternately allocated to a north pole N and a south pole S. The six rotor positions constitute a commutation cycle wherein the stator coils A, B and C are powered in pairs with + and −. The power application is programme-controlled and by way of stator 44 commutates a rotating magnetic field which "pulls" the permanent magnets of the rotor 54 with a leading rotary field. The armatures 52 of the three stator coils A, B C extend in rotor form over part of the inner casing of rotor 54.

Angle φ designates the mechanical position of the rotor 54 in relation to the zero point. From left to right φ is 150, 450, 750, 1050, 1350 and 1650.

Figure 4:
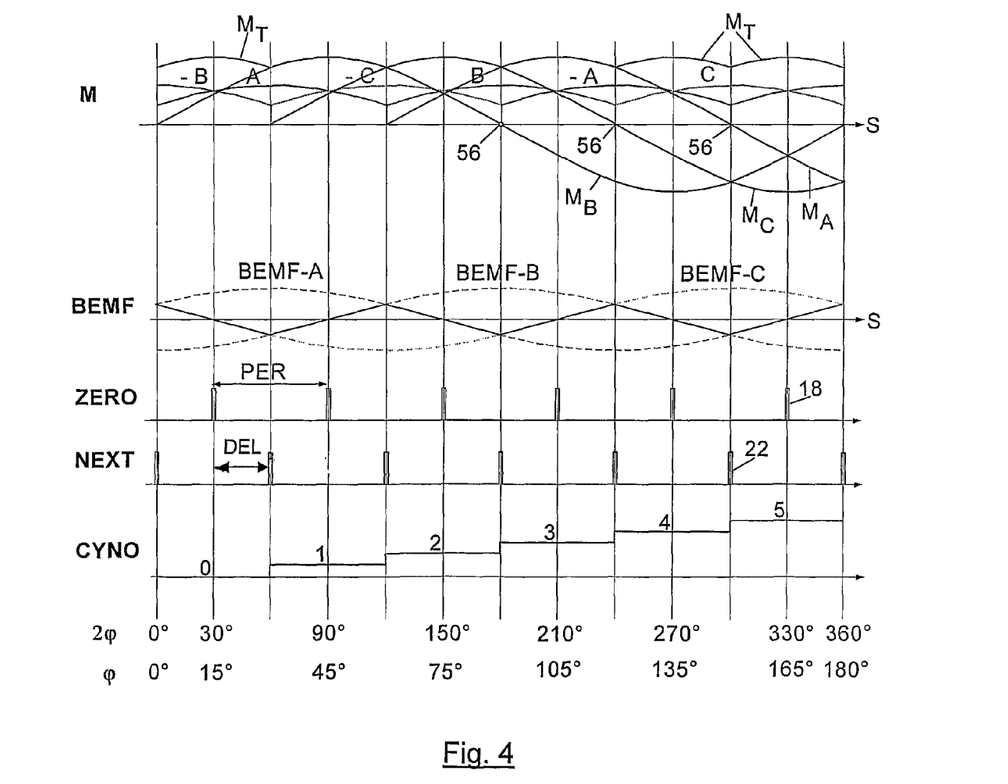

FIG. 4 shows the proportion of the individual stator coils A, B and C in the torque, in other words the connection between the rotor position and the torques acting on the rotor 54. The mechanical angle φ (FIG. 3) of rotor 54 is indicated with vertical lines. These lines also correspond to the electrical position 2φ on the abscissa, 30°, 90°, 150°, 210°, 270° and 330° of the respective mechanical angle φ.

The diagram shows a four-pole DC motor 46 (FIGS. 2, 3) and not a twelve-pole motor which is normal in practice because the connections are easier to show with as simple a motor as possible. A twelve-pole motor turns three times more slowly than a four-pole motor, otherwise there are no substantial differences.

The torque designation M shows the individual proportions of the stator coils A, B, C in the total torque $M_T$. Each of these stator coils acts with a sinusoidal torque on the rotor. As each stator coil is switched off for 60°, for 30° on both sides of the zero, this torque proportion is absent there. This is reflected in the undulating form of the total torque $M_T$. On zero crossing 56 of the sinusoidal torque $M_B$ where the power is supplied only through stator coils A and C, a stable position is achieved. The same applies to the torque of stator coils A and C. The zero crossings of the torques $M_A$, $M_B$ and $M_C$ are designated below as 56.

Below the torque curves M are shown further parameters in the respective positions mechanically φ or electrically 2φ:

BEMF. Curves BEMF-A, BEMF-B and BEMF-C of the individual stator coils A, B and C run sinusoidally. In the ranges ±30° from the zero crossing, i.e. the intersection of the sine curve with the zero line S in the range of the high impedance commutation gaps L (FIG. 5), the curves are drawn in solid lines.

ZERO. At φ=15°, 45°, 75°, 105°, 135° and 165°, a ZERO pulse 18 is triggered i.e. a valid zero crossing of the BEMF comparator 12 (FIG. 1) is registered. The angle between the zero crossings is designated PER.

NEXT. Also indicated with needle pulses are the NEXT pulses 22 which trigger the times of the commutation change. These are offset temporally to the ZERO pulses 18 by an angle DEL=PER/2. In the present case the duration of the needle pulse is ZERO and NEXT is 52 microseconds (µsec).

CYNO. Finally CYNO shows the counter states of the cycle counter 24 (FIG. 1) from 0 to 5, in other words showing which commutation is occurring at the respective φ on the DC motor.

Figure 5:
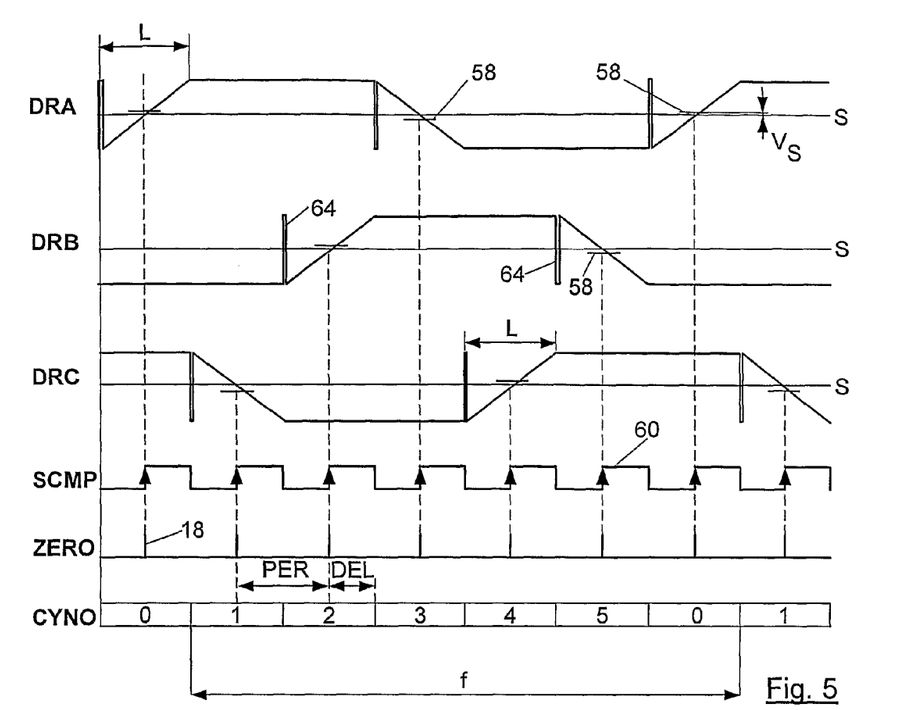

FIG. 5 shows the correlation of the phase voltages DRA, DRB and DRC with the high impedance commutation gaps L of electrically 2φ=60° in the present case. In these high impedance commutation gaps L, at low rotation speed at their end and at high rotation speed at the end of the power phase, the BEMF comparator 12 (FIG. 1) analyses the phase voltage. The BEMF comparator thresholds 58, depending on polarity of the expected zero crossing, are located just—by $V_s$—above or below the zero line S. This increases the fault distance and supplies more reliable ZERO pulses 18, which brings improvements mainly at low speeds. At the start of a high impedance commutation gap L, a return pulse 64 is also generated. A zero crossing detected correctly by the BEMF comparator 12 generates a positive SCMP flank. The SCMP (=synchronised comparator) is reset on commutation of the H-bridge. The said flanks generate the ZERO pulses 18 that are 52 microseconds wide in the present case. The distance between the ZERO pulses 18 is the "ten bit word" PER. This is inversely proportional to the rotation speed. PER/2 gives the DEL (=delay). Commutation occurs between two ZERO pulses 18. CYNO is the value of the 0, 1, 2, 3, 4, 5 cycle counter and indicates which commutation is present at the DC motor. A commutation cycle f corresponds to 1/commutation frequency.

Figure 6:
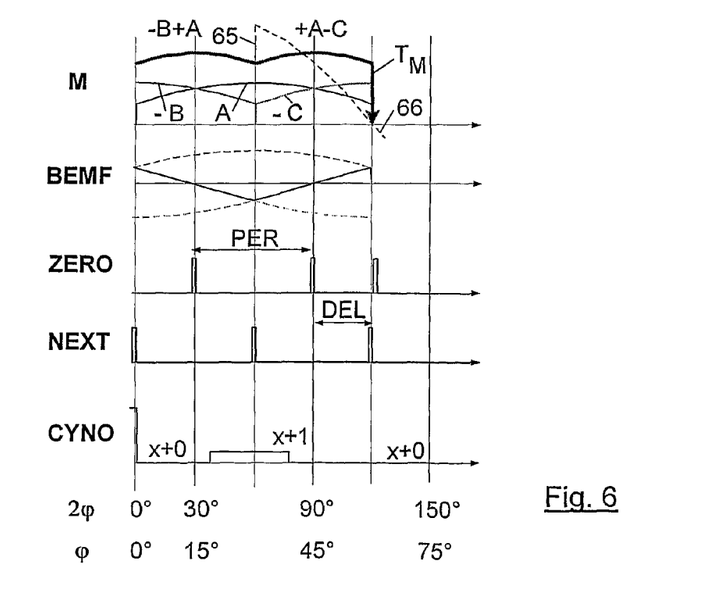

FIG. 6 shows an abrupt braking, also known as a blocking or lever braking. The positions of the rotor 54 correspond to the left half according to FIG. 3. At a mechanical angle φ of 30° a strong current pulse 65 generates an amplified resulting torque −B+A which is indicated by a falling dotted line 66. The rotor is stopped with immediate effect. The holding point is stable in the range of 2φ±180° electrically i.e. φ±90° mechanically. Within this range the rotor returns to the holding point provided. This braking method is highly reliable. The total torque $T_M$ diminishes drastically.

The counter value CYNO first rises from x+0 to x+1 but then after the current pulse falls again to x+0. In analogy with the braking of a vehicle with spoked wheels by insertion of a rod, the brake process according to FIG. 6 is called the "lever brake".

According to FIG. 6, at the commutation time, instead of the next phase the last phase is activated again, because at this time this has precisely the torque zero crossing.

The braking according to FIG. 6 with PWM=0 is a simple stop method for a DC motor but has the disadvantage that at low speeds the braking moment also diminishes. The strong additional current pulse 65 must be applied at the correct moment, which is not easy because the motor position is difficult to predict. Preferably therefore the speed is regulated down to 350 to 400 rpm, whereupon the current pulse 65 takes place which blocks the rotor immediately. The correct moment for the current pulse can then no longer be adapted.

Figure 7:
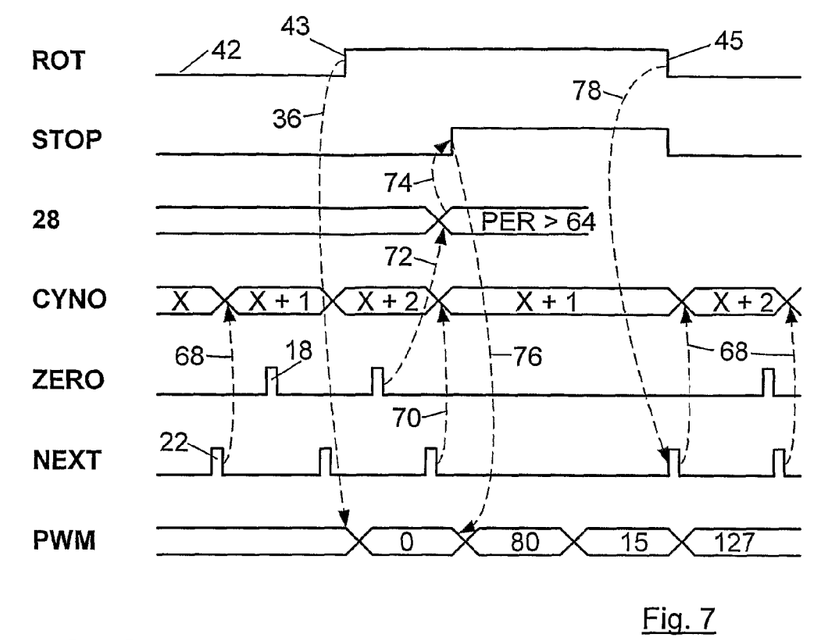

Another method for braking a DC motor is indicated in FIG. 7 with a cycle of brake-stop-start. The normal operating sequence is characterised by arrow 68. On initiation of braking, the status control (state machine) in digital block 40, by means of a falling flank 43 of the ROT signal 42, tells the motor control 30 by way of PWM clock generator 34 (FIG. 1) that the DC motor should be stopped, which takes place with a PWM signal 36. This sets the PWM to 0 i.e. the H-bridges now short-circuit the stator coils, which brakes the DC motor.

However commutation continues from the BEMF analysis, the rotor positions are therefore still known as indicated by arrows 70, 72. As soon as the speed control establishes from the PER signal 26 that the rotation speed has fallen below a value of 400 rpm, the stop process initiated by arrows 74, 76 is initiated. The motor control 30 switches to the last instead of to the next commutation state and the corresponding stator coils are powered with a PWM=80 for 100 ms. This stops the rotor immediately. The counter value CYNO is decremented by 1. After the fast stop in the sense of a lever inserted in the spokes of a wheel, during a holding phase the PWM is reduced to 15 or 0. The restart of the rotor is triggered by the rising flank of the ROT signal 42, a NEXT pulse 22 is generated by way of arrow 79 and the stator coils of the powerless or inhibited PWM circuit are increased to 127. After the start, commutation takes place as normal using the BEMF analysis.

Figure 8:
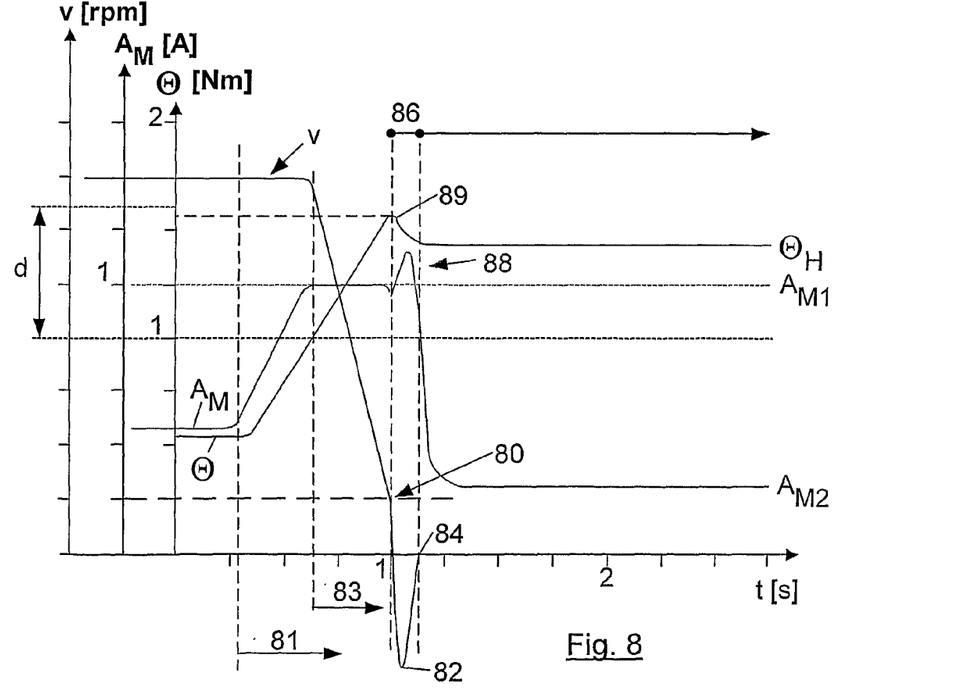

FIG. 8 shows the behaviour of a DC motor in practical operation when for example an air flap hits a stop. The abscissa shows the time t and the ordinate from left to right the rotation speed v, the motor current $A_M$ and the torque θ.

The rotation speed curve v first runs parallel to the abscissa and the rotation speed is constant. To initiate the braking process (arrow 81), the motor current A is increased until the current limit $A_M$ is reached (arrow 83), with a slight temporal delay the torque θ also rises. The braking process (arrow 81) is initiated when the flap hits the stop. As in FIG. 7 the PWM is set to 0, the H-bridges short circuit the stator coils. Even after the flap hits the stop, the DC motor runs on, it stalls until reaching the stop 80 where no further zero crossings can be measured, and the position of the rotor is lost. After stoppage of the DC motor at peak 82, thanks to the elasticity of the highly reduced, tensioned gear, the motor turns backward until the flap remains on the stop with the residual contact pressure. The position of the rotor can be detected again with special measures when the reduction gear in point 84 stops in the range of the controlled braking 86 ("kick brake"). If the reduction gear turned further back beyond this self-inhibition, the contact pressure of the flap would be lost. After reaching the peak 82 the DC motor is accelerated briefly in the opposite direction so that BEMF signals 13 (FIG. 1) are output and a defined holding current can be set. The logic again knows the rotor position. Now the rotor can be braked under control with PWM=0 as soon as the rotation speed for example has fallen below 400 or 500 rpm. The brief turning back of the DC motor reduces the contact pressure of the air flap only slightly since for this only a few motor revolutions are required.

The motor current $A_M$ rises in the area of the controlled braking 86 ("kick brake") which is indicated with boost motor current increase 88 and then falls to a lower level $A_{M2}$ which in the present case is around 20 to 30% of the nominal current. The reduced motor current $A_{M2}$ is operated during the air flap holding phase with a low PWM.

The torque θ rises until the controlled braking 86 ("kick brake") begins, reaches a maximum peak 89 and falls during the stop braking 86 to the constant torque in the holding position, the holding moment $\theta_H$. The dynamic part of the stop force is indicated with d.

Figure 9:
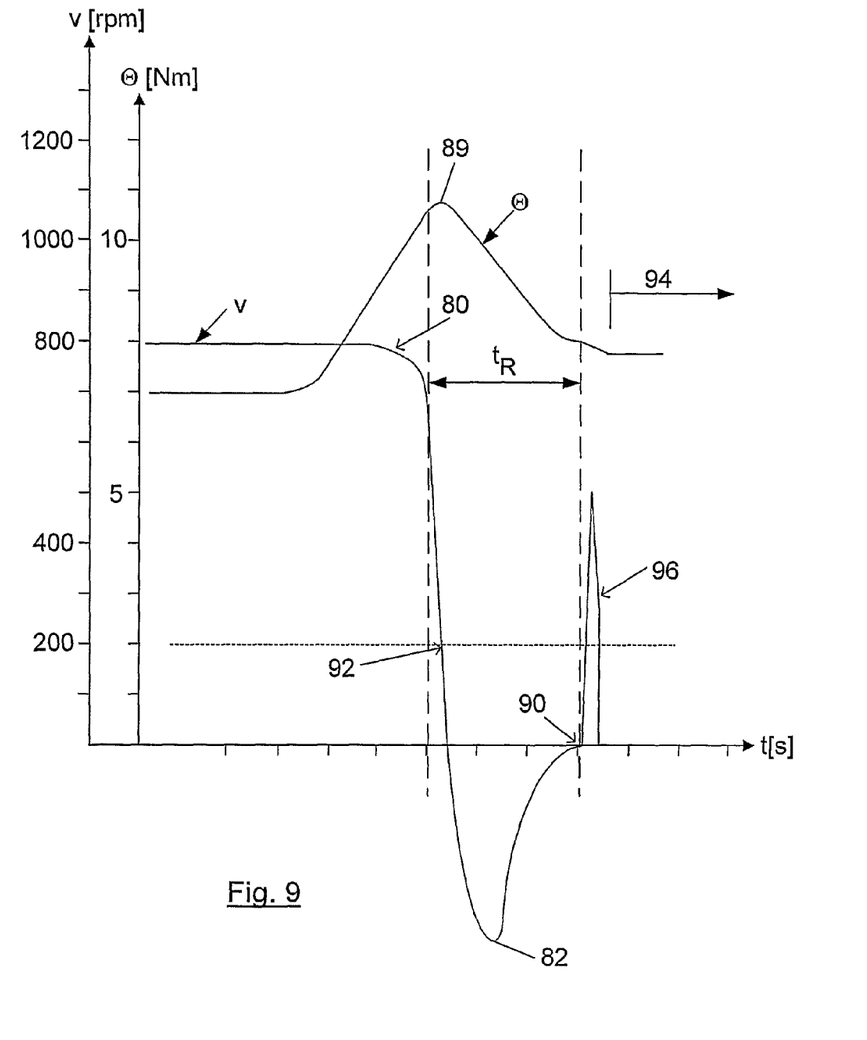

FIG. 9 shows the rotation speed v and the torque θ over time t. In contrast to FIG. 8, no holding moment $\theta_H$ is maintained here, the reduction gear is fully relaxed after an unbraked stop of the air flap driven by the DC motor. At the stop 80 of the air flap, the DC motor, thanks to the elasticity of the reduction gear, runs on until peak 82 is reached. Thanks to the elasticity the motor turns back and reaches stoppage 90. Immediately after the flap has stopped (area 80) the DC motor is short-circuited for a few seconds $t_R$. This has a mechanical damping effect during relaxation (turning back of the reduction gear). In other words at low speeds the reduction gear turns uninhibited, while at high speeds a short-circuit current flows which brakes the rotor.

When the rotation speed v falls below 200 rpm in the present case, no further BEMF signals are generated and the commutation positions are lost. After the stoppage position 90 the DC motor is accelerated briefly in the opposite direction and then braked under control. Depending on setting, now in the motor a torque is impressed or the motor current is switched powerless. The motor is now with a known commutation position in the holding position as indicated with arrow 90. This latter stage is called the reverse pulse 96 (reverse kick).

Figure 10:
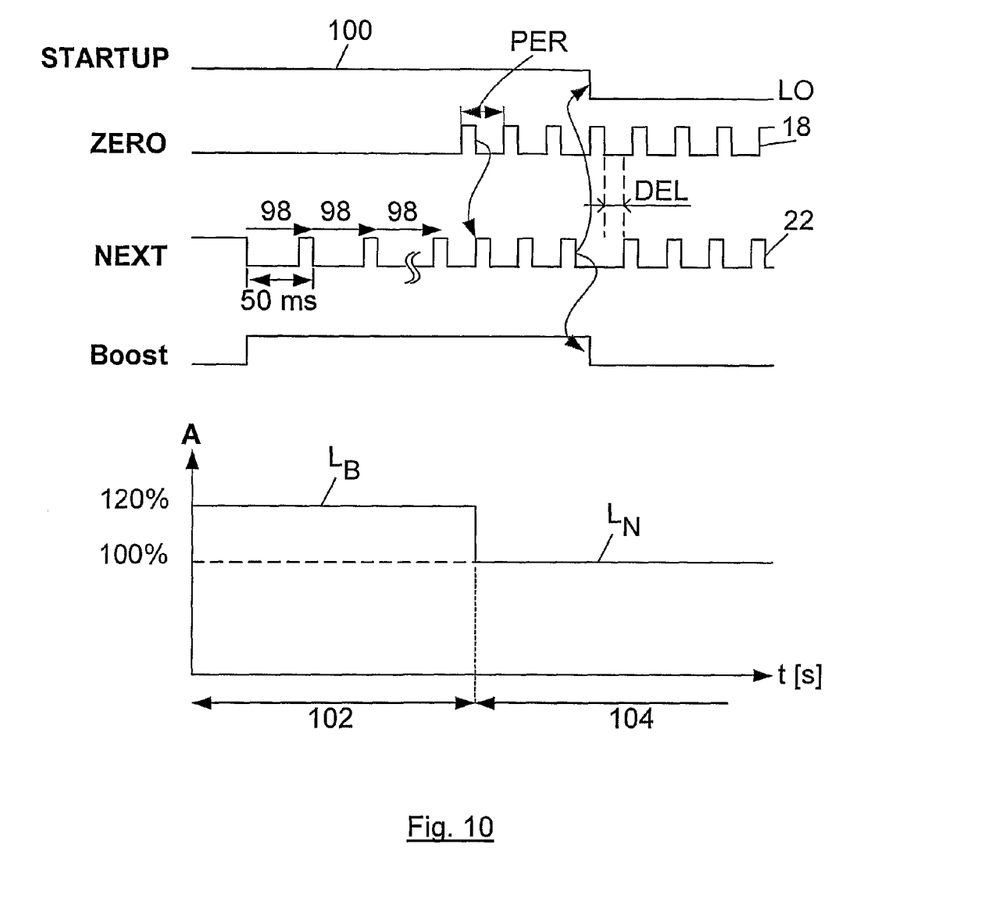

On engagement of the "boost" function according to FIG. 10, the DC motor 46 (FIG. 2) receives more torque on starting. This allows it to start even under difficult conditions. As long as the ASIC (application specific integrated circuit) is in STARTUP mode, the current limit is raised by 10 to 50%, in the present case by 20%. A STARTUP signal 100 stipulates whether the control logic of the motor in digital block 40 (FIG. 1) is in start up or stable controlled mode. On starting, the motor is accelerated as soon as three BEMF zero crossing ZERO pulses 18 are detected. On conclusion of the STARTUP process the speed regulator 28 (FIG. 1) takes over the motor and guides this to the required nominal value. Although according to FIG. 10 the boost is activated, the motor does not immediately accelerate so quickly that ZERO signals 18 can be generated. The cause of this failure could be too high a load or the rotor in an unfortunate position. The START algorithm now, after expiry of a specified number of time-outs 98, itself generates NEXT pulses 22. After three ZERO signals 18 the STARTUP signal 100 goes to LO (low) and the cycle counter 24 (FIG. 1) takes over the motor. The current limit over the time t is shown from the lower part of FIG. 10. On connection of the cycle counter 24, the current limit Boost $L_B$ in area 102 falls from 120% to the current limit $L_N$ normal mode 104 of 100%. Boost and STARTUP are switched off when three ZERO pulses 18 have been detected i.e. a rotation speed of around 200 rpm has been reached.

Figure 11:
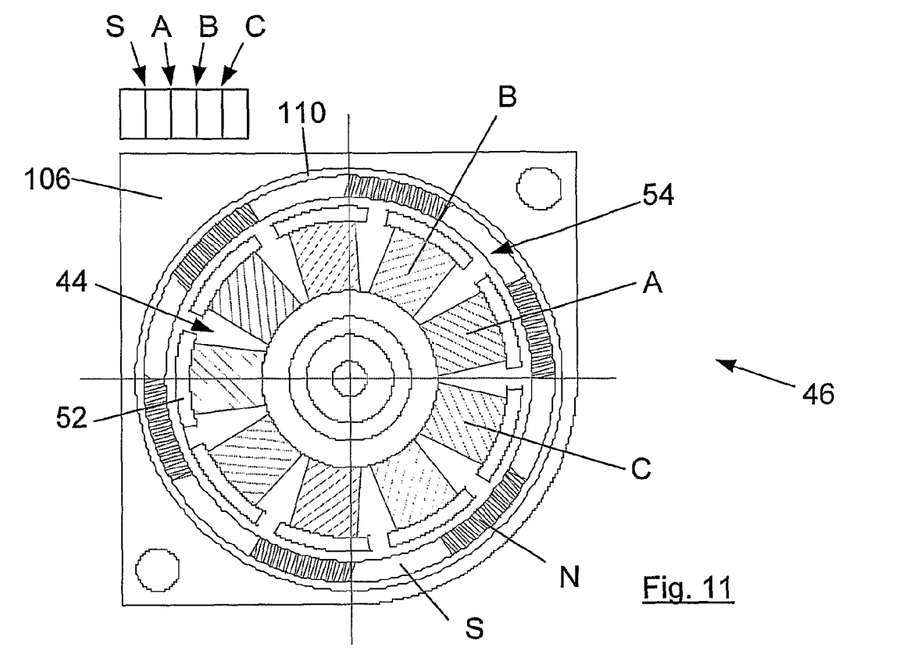

FIG. 11 shows a DC motor 46 with a twelve-pole (6m) rotor 54 with six (3n) magnetic pole pairs north N and south S. The stator 44 comprises nine stator poles 52 or armatures each with three stator coils A, B and C, i.e. n=3 and m=6. The permanent magnet rotor 54 is held by means of a drive shaft mounted in a base plate 106 with a cup-shaped external rotor.

Figure 12:
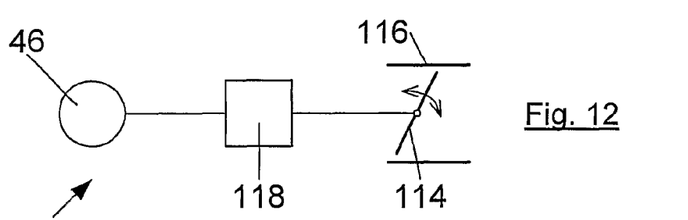

FIG. 12 shows an actuating drive 112 with an actuator 114 in the form of a swivellable flap in an HLK pipe 116. A DC motor 46 swivels the flap by means of a highly reduced reduction gear 118.

Figure 13:
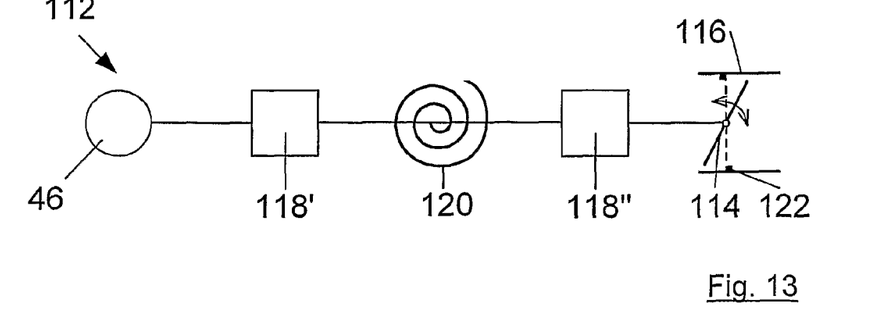

FIG. 13 shows an actuating drive 112 formed as a spring drive. Between the DC motor 46 and the actuating drive 114 is formed gear mechanics unit 118', 118" which is supplemented by a spiral spring 120. A first reduction gear 118' is highly reduced, a second reduction gear 118" only relatively little. The spring 120 is pre-tensioned and on power failure closes the flap-like actuator 114. Two fast a closure is prevented by the measures according to the description of FIG. 2, a short-circuit of two stator coils to earth takes place in the manner shown there.

All individual elements of the actuating drive 112, DC motor 46, gear 118 or 118', 118", spiral spring 120 and actuator 114 are rigidly connected together.

The end position, the closed position of the flap-like actuator 114, is reached when it lies against the stop cam 122.

The invention claimed is:

1. Method for controlling a brushless DC motor comprising a stator having stator coils and rotor, wherein a highly reduced reduction gear of an actuating drive is provided for coupling the DC motor to a flap or a valve in order to regulate a gas or liquid volume flow, wherein an electrical current flow in the stator coils is commutated under programme control of a motor control without integral position sensors, comprising the steps of:
   a) during normal operation, counting motor revolutions of the DC motor by an electronic circuit by checking a polarity of a zero crossing of each of the three phase voltages of the stator coils with BEMF comparators,
   b) initiating of breaking by generating a signal for telling the motor control that the DC motor should be stopped,
   c) continuing commutation from the BEMF analysis until rotation speed has fallen below a value of 400 rpm, and
   d) then, effectuating an immediate stop by algorithms for stopping the rotor so that no counting errors occur.

2. Method according to claim 1, comprising the steps of
   a) detecting valid zero crossings of three phase voltages,
   b) allocating a particular rotor position to each of a plurality of polarity changes and,
   c) determining a next commutation as soon as the respective rotor position is reached.

3. Method according to claim 2, characterised in that the valid zero crossings are detected by means of a ZERO detector and ZERO pulses are generated.

4. Method according to claim 3 characterised in that from the BEMF signals which on valid zero crossings cause ZERO pulses, a period counter calculates the next commutation time and a corresponding control signal, a NEXT pulse, is emitted.

5. Method according to claim 2, characterised in that a direction of rotation of the rotor is determined by means of the BEMF comparators in that the BEMF comparator thresholds, depending on polarity of the expected zero crossing, are located just above or below a zero line of the phase voltages.

6. Method according to claim 5, characterised in that the direction of rotation of the rotor in the high impedance commutation gaps of the phase voltages is determined at low speeds at an end of the commutation gap and at high speeds at an end of a passive PWM phase.

7. Brushless DC motor without position sensors for performance of the method according to claim 1, characterised in that it comprises a stator with three stator coils which extend over 3n stator poles and an annular permanent magnet rotor with 2m permanent magnet segments of alternating polarity, a coaxial cup-shaped external rotor and a coaxial drive shaft, where n and m are whole multiplication factors 1, 2, 3, 4 . . . independent of each other.

8. Brushless DC motor according to claim 7, characterised in that n=1 and m=1 or n=3 and m=6.

9. Method for controlling a brushless DC motor comprising a start-up mode and a normal mode, wherein an electrical current flow in a stator of the DC motor is generated by DC motor end stages and is commutated under control of a programme without integral position sensors, comprising the steps of:
   a) in the start-up mode, commutating the DC motor end stages and increasing their current limit to a start-up level that is higher than a current limit of the normal mode for an accelerated start until valid BEMF signals are reached,
   b) switching to the normal mode after valid BEMF signals are reached, wherein commutation of a next phase is located between two zero crossings and wherein the current limit of the DC motor end stages is reduced from the start-up level to the current limit of the normal mode.

10. Method according to claim 9, characterised in that after an unsuccessful powering of a first end stage of said DC motor end stages, a logic commutates in steps the current supply of a next end stage of said DC motor end stages until a starting position which is favourable for the rotor is reached.

11. Method according to claim 10, characterised in that the logic detects a wrong direction of rotation of the rotor from the wrong polarity of the BEMF signals and corrects this by increasing counter state of a cycle counter by two steps.

12. Method according to claim 9, characterised in that on lack of detection of a zero crossing of a phase voltage, after a first commutation the rotor oscillates with its resonant frequency into the zero position and by these zero crossings, valid BEMF signals are achieved.

13. Method according to claim 9, wherein the current limit is increased in the start-up mode to a level of at least 110% and at most 150% of the current limit of the normal mode.

14. Method for controlling a brushless DC motor having a stator and a rotor and comprising a brake mode for braking and holding the rotor, wherein an electrical current flow in the stator of the DC motor is commutated under control of a programme without integral position sensors, comprising the steps of:
  a) in a first step of the brake mode, switching all stator coils powerless by short circuit under continuing commutation,
  b) in a second step, after reaching a pre-set rotation speed threshold value of the rotor, applying a greatly increased current pulse leading to block the rotor for changing to a last commutation state, and in a third step again by short circuit switches the stator coils of rotor powerless or inhibits them with low pulse width modulation (PWM).

15. Method according to claim 14, characterised in that the rotor in the first step is switched actively in the opposite direction.

16. Method for controlling a brushless DC motor for moving a flap in a ventilation system or a ball valve in a water pipe system, wherein the DC motor has a stator and a rotor and drives the flap or the ball valve by means of a highly reduced reduction gear and the system has a stop for the flap or ball, wherein an electrical current flow in the stator of the DC motor is commutated under control of a programme without integral position sensors, wherein for achieving and holding a high contact pressure by the reduction gear in a stop position of the flap or valve, the following steps are provided:
  a) allowing the DC motor to be stalled when the flap or ball runs against the stop and the rotor inertia torque continues to rotate uncontrolled for a few revolutions,
  b) detecting the rotor position by an immediately subsequent brief acceleration in the opposite direction by means of BEMF signals, and
  c) braking and holding the rotor under control.

17. Method according to claim 16, characterised in that acceleration in the opposite direction takes place only after relaxation of the reduction gear.

18. Method according to claim 16, characterised in that the process algorithms are stored retrievably.

19. Method according to claim 16, characterised in that an electronic unit counts the revolutions of the rotor of the DC motor.

20. Method according to claim 19, characterised in that algorithms for start and stop cause motor speeds below around 200 rpm to be passed quickly and without the occurrence of counting errors.

21. Method for controlling a brushless DC motor of an actuating drive with a pre-tensioned spring, an actuating drive for moving a flap in a ventilation system or a ball valve in a water pipe system, wherein the DC motor has a stator and a rotor and drives the flap or the ball valve by means of a highly reduced reduction gear and the system has a stop for the flap or ball, wherein an electrical current flow in the stator of the DC motor is commutated under control of a programme without integral position sensors, comprising the step of:
  a) on a power failure, switching two of the three individually switchable bridge switches of a switch group for short circuiting two of the three stator coils of the DC motor to ground when the speed falls below an adjustable limit speed of the rotor.

22. Method according to claim 21, characterised in that a pair of said bridge switches is activated by way of a pulse width modulated control signal from the allocated transistors.

23. Method according to claim 21, characterized in that the adjustable limit speed of the motor is around 400 rpm.

24. Method for controlling a brushless DC motor comprising a stator and a rotor having stator coils, wherein a highly reduced reduction gear of an actuating drive is provided for coupling the DC motor to a flap or a valve in order to regulate a gas or liquid volume flow, wherein an electrical current flow in the stator coils is commutated under programme control of a motor control without integral position sensors, comprising the steps of:
  a) during normal operation, counting motor revolutions of the DC motor by an electronic circuit by checking a polarity of a zero crossing of each phase voltage of the stator coils with BEMF comparators,
  b) initiating breaking by generating a signal for telling the motor control that the DC motor should be stopped,
  c) short circuiting the stator coils by the motor control so that the DC motor brakes,
  d) continuing commutation from the BEMF analysis until rotation speed has fallen below a value of 400 rpm,
  e) effectuating an immediate stop by algorithms for stopping of the rotor so that no counting errors occur.

25. Method for controlling a brushless DC motor comprising a stator having stator coils and rotor, which has a highly reduced reduction gear of an actuating drive for a flap or a valve in order to regulate a gas or liquid volume flow, wherein an electrical current flow in the stator coils is commutated under programme control without integral position sensors, comprising the steps of:
  a) counting motor revolutions of the DC motor by an electronic circuit,
  b) detecting valid zero crossings of three phase voltages,
  c) checking a polarity of a zero crossing of each of the three phase voltages with BEMF comparators,
  d) allocating a particular rotor position to each of a plurality of polarity changes and,
  e) determining a next commutation as soon as the respective rotor position is reached
  f) controlling the switching between the three phase voltages by the BEMF signals, and
  g) effectuating an immediate stop by algorithms for stopping the rotor if motor revolutions fall below about 200 rpm so that no counting errors occur,
wherein a direction of rotation of the rotor is determined by means of the BEMF comparators in that the BEMF comparator thresholds, depending on polarity of the expected zero crossing, are located just above or below a zero line of the phase voltages.

26. Method according to claim 25, characterised in that the direction of rotation of the rotor in the high impedance commutation gaps of the phase voltages is determined at low speeds at an end of the commutation gap and at high speeds at an end of a passive PWM phase.

* * * * *